(12) United States Patent
Mui et al.

(10) Patent No.: US 6,947,187 B2
(45) Date of Patent: Sep. 20, 2005

(54) APPARATUS AND METHOD FOR CALIBRATING A SCANNER WITH A DOCUMENT FEEDER

(75) Inventors: Paul K. Mui, Boise, ID (US); Eric L. Andersen, Meridian, ID (US); Russell A. Mendenhall, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 887 days.

(21) Appl. No.: 09/866,015

(22) Filed: May 24, 2001

(65) Prior Publication Data

US 2002/0176122 A1 Nov. 28, 2002

(51) Int. Cl.[7] .............................. H04N 1/04; H04N 1/40
(52) U.S. Cl. ...................... 358/496; 358/474; 358/498; 358/494; 358/461
(58) Field of Search ................................ 358/496, 474, 358/498, 494, 461

(56) References Cited

U.S. PATENT DOCUMENTS

| | | | |
|---|---|---|---|
| 4,429,333 A | 1/1984 | Davis et al. ................. | 358/293 |
| 4,970,606 A * | 11/1990 | Shima ......................... | 358/474 |
| 5,101,284 A * | 3/1992 | Tanabe ........................ | 358/461 |
| 5,237,172 A | 8/1993 | Lehman et al. ............... | 250/235 |
| 5,280,368 A | 1/1994 | Fullerton ..................... | 358/474 |
| 5,424,537 A | 6/1995 | Lehman et al. ............... | 250/235 |
| 5,513,017 A | 4/1996 | Knodt et al. ................. | 358/471 |
| 5,796,928 A | 8/1998 | Toyomura et al. ........... | 395/474 |
| 6,185,405 B1 * | 2/2001 | Sueoka ........................ | 399/367 |

* cited by examiner

*Primary Examiner*—Edward Coles
*Assistant Examiner*—Houshang Safaipour

(57) ABSTRACT

An apparatus and method for calibrating a scanner connected to a document feeder are provided. In one embodiment, the apparatus includes a calibration strip attached to a rotatable wheel assembly disposed within the document feeder. A cam is provided to rotate the wheel assembly and expose the calibration strip to the field of view of a head assembly of the scanner for calibration. The cam is configured to then rotate the wheel assembly in the opposite direction, so that the calibration strip is no longer exposed to the head assembly. A cleaning blade may be provided to wipe the calibration strip as it is moved to its non-exposed position.

16 Claims, 6 Drawing Sheets

APPARATUS AND METHOD FOR CALIBRATING A SCANNER WITH A DOCUMENT FEEDER

BACKGROUND OF THE INVENTION

The present invention generally relates to an improved apparatus and method for calibrating an image-capturing device that is connected to a document feeder. More particularly, it relates to an apparatus and method for calibrating a scanner which positions a calibration strip within the document feeder into an optical path of a scanner head assembly while the assembly is ready to scan a document fed by the document feeder.

Image-capturing peripherals such as scanners have become increasingly useful, affordable and common devices for homes and businesses. These devices are useful for capturing and storing images such as text, graphic or pictorial images contained on documents. Various types of scanners include flatbed, drum and handheld scanners. With a flatbed scanner, one of the most common types of scanners, a document to be scanned is typically placed onto a transparent glass platen of the scanner, where a scanner head assembly (also referred to as a carriage assembly) moves underneath the document to capture the image contained on the document. The image in digital form is often transmitted to a connected computer, though it may instead be stored within the scanner, or transmitted directly to another peripheral such as a printer or facsimile (fax) machine.

To scan a quantity of documents, a document feeder (such as an automatic document feeder or ADF) may be attached to the scanner to feed documents over the scanner head assembly, where the images on the documents are captured as they pass over the scanner head assembly. Often, a scanner and document feeder are integrated with a printer or fax machine to form a multi-function printer. Alternatively, the scanner may digitally send image information to the printer.

FIG. 1 is a cross-sectional view of a typical flatbed scanner combined with a document feeder. A scanner, indicated generally at 10, includes a head assembly 12 having a scanning lamp for producing a light for illuminating a document through a glass platen 14, and may also contain mirrors and a lens to direct and focus the reflected light. The head assembly 12 includes a photodetector, such as a charge-coupled device (CCD) containing an array of pixels, each of which are configured to detect the reflected light and convert it into a signal for processing by another peripheral or by a connected computer (not shown). The head assembly 12 travels longitudinally along one or more rails 16 of the scanner 10, and is driven by a pulley and one or more rollers (not shown).

A document feeder 20, which may be attached to the scanner 10 via hinges (not shown), feeds the paper into a scanning position along a generally U-shaped paper path 22 (more clearly shown in FIGS. 2 and 3), substantially surrounding a guiding mechanism such as a typically hollow cylindrical guide 50. The document feeder 20 uses a feeding mechanism having a series of rollers, including a pick-up roller 24, pairs of feed rollers 26, 28, 30, and a pair of delivery rollers 34 to feed the paper through the paper path 22. A transparent guide strip 36 of polyester, such as MYLAR, guides the paper along a bottom portion of the paper path 22. A section 38 of the guide strip 36 allows the head assembly 12, when in a scan position 40 (as shown in FIGS. 1 and 2) to capture images on paper, because the paper is within an optical path (field of view) of the head assembly.

Before scanning one or more documents, a scanner is typically calibrated for photo response non-uniformity (PRNU) calibration, among other things. FIG. 3 shows a simplified representation of a typical scanner/document feeder with the head assembly 12 in a predetermined "home" (calibration) position 42. To calibrate the scanner 10, a stationary calibration strip 44 is attached to the scanner over the home position 42 of the head assembly 12. The strip is positioned away from the paper path 22 and is thereby protected from dust from the paper being scanned. The head assembly 12 scans the stationary, preferably white calibration strip 40 to calibrate the scanner 10 in a manner known in the art.

When scanning a document fed by the document feeder 20, and referring to FIG. 2, the head assembly 12 has to move from the home position 42 to the scan position 40 so that a portion of the paper being scanned is in the optical path or field of view of the head assembly 12 through the portion 38 of the guide strip 36. The distance between the home position 42 and the scan position 40 is typically about 13 mm, but of course this distance may vary.

To produce a high quality scan, calibration ideally should be done for every scan page. However, for high speed document feeding, it is almost impossible to calibrate every scan page because of the mass and inertia of the head assembly 12. Because additional time and power are required to activate the head assembly 12 for every ADF-fed scan job, the scan performance is gradually degraded, due to wear on the head assembly 12, and its mechanism for movement. The redundant quick and short jacking motion of the head assembly 12 can detrimentally impact the scan quality of the scanner 10.

Because about 80% of overall scan jobs are fed from the document feeder for a typical MFP, a significant improvement in reliability and scan quality of the scanner, as well as the print quality of connected printers, would result if the head assembly remained stationary during ADF-fed scanning jobs.

BRIEF SUMMARY OF THE INVENTION

The present invention provides an inventive apparatus for calibrating an image-capturing apparatus, such as a scanner, of the type which has a document feeder. The apparatus includes a calibration member that is disposed within the document feeder and is movable to a position within the optical path of the scanner head assembly when it is ready for scanning. Before a scan job, or before an individual document is scanned by the scanner head assembly, the head assembly scans the calibration member for the purpose of calibrating the scanner. In this way, it is possible to calibrate the scanner head assembly without moving the scanner from its scan position.

In one embodiment, a wheel assembly is provided for rotating the calibration member into and out of the optical path of the scanner head assembly. A cam, together with a biasing member, moves the wheel assembly between two positions, so that the calibration member is either exposed to the scanner head assembly or not.

In a preferred embodiment, the calibration apparatus includes a wheel assembly contained within a cylindrical guide of the document feeder, having a calibration strip attached to an outer circumferential surface. The cylindrical wheel rotates about an axis parallel to the length of the head assembly, across the width of the document feeder. A cam is provided for driving rotation of the wheel assembly by contacting a first flat surface of the wheel assembly. A biasing member is attached to a second flat surface of the wheel assembly, to bias the wheel assembly against the cam. The wheel assembly is rotated into either of two positions to position the calibration strip either into an exposed position (into the optical path of the head assembly) or non-exposed position (out of the optical path) while the head assembly is in a position ready for scanning. In a further preferred embodiment, a cleaning blade is also provided to remove contaminants from the calibration strip.

DETAILED DESCRIPTION

Figure 1:
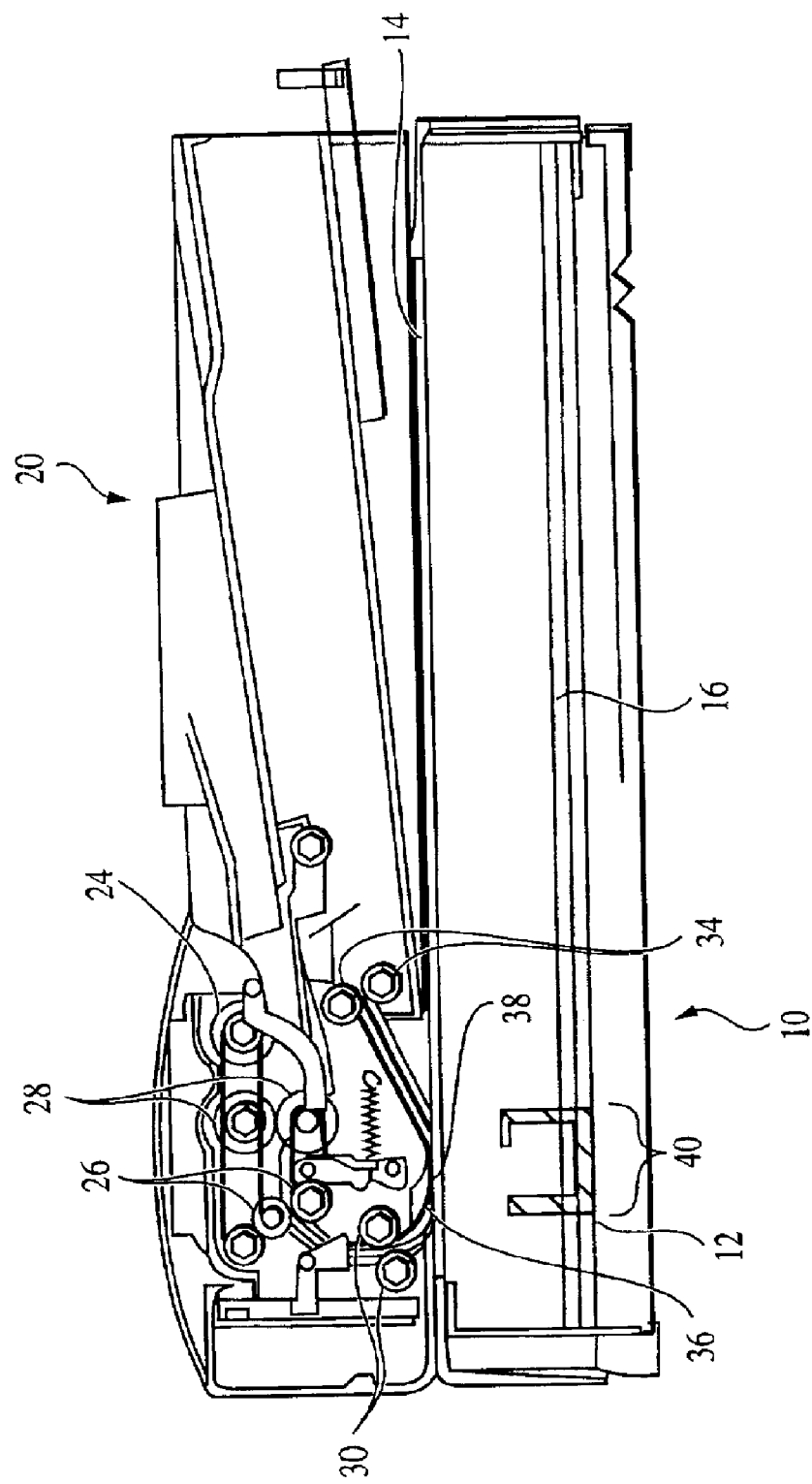
FIG. 1 is a side sectional view of a typical prior art scanner combined with a document feeder.
Figure 2:
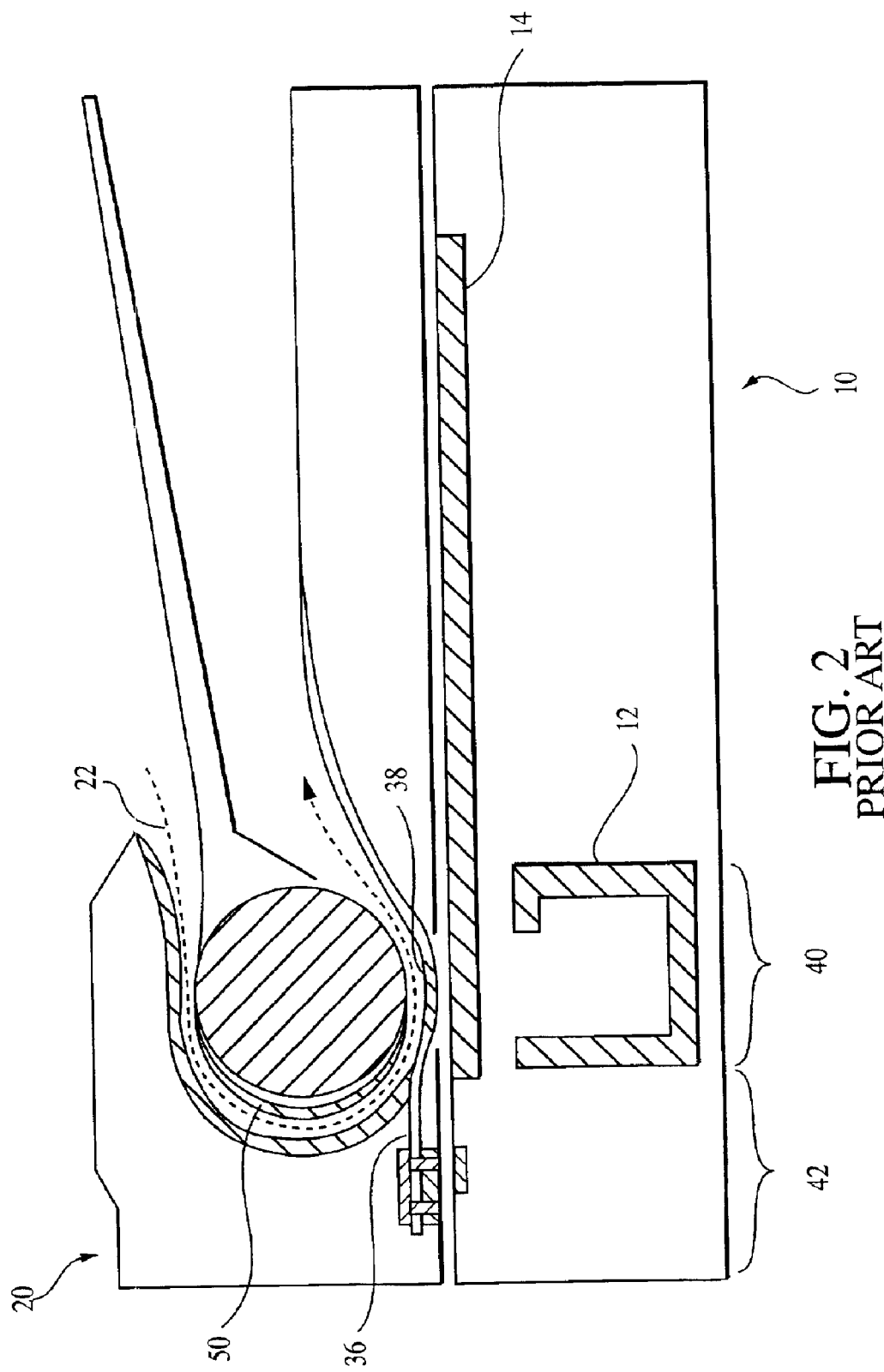
FIG. 2 is a side illustration of a typical prior art scanner and document feeder with a scanner head assembly in a scan position.
Figure 3:
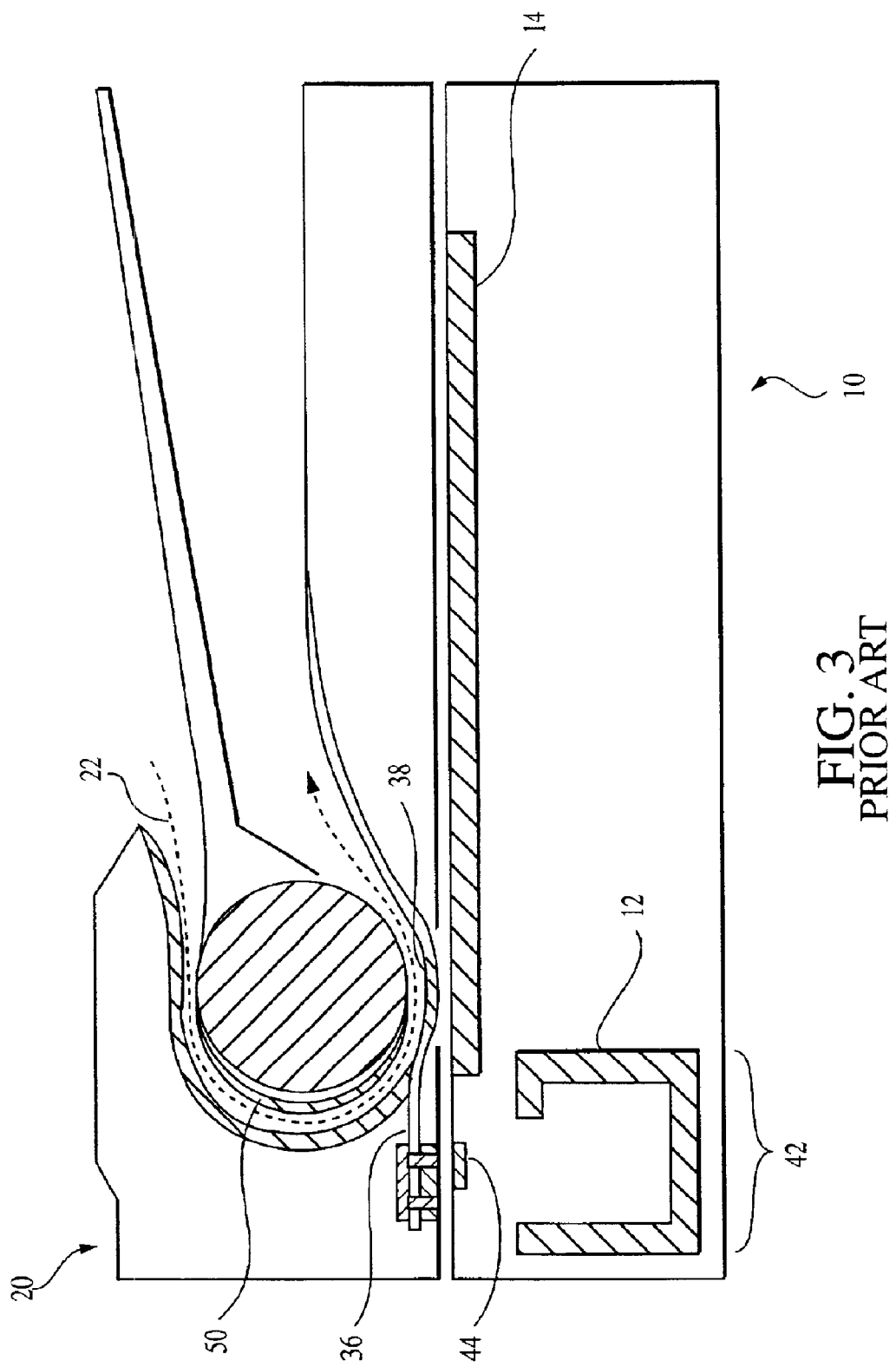
FIG. 3 is a side illustration of the scanner and document feeder of FIG. 2, with the scanner head assembly in a home position.

While the apparatus is described and pictured herein for a flatbed scanner having a document feeder, it is important to understand that the principles of the inventive calibration apparatus can be applied for any image-capturing apparatus that is combined or equipped with a document feeder. The descriptions that follow are in no way intended to limit the scope of the inventive calibration apparatus to an MFP or similar device. Where appropriate, the same reference characters are used to designate like parts.

Figure 4:
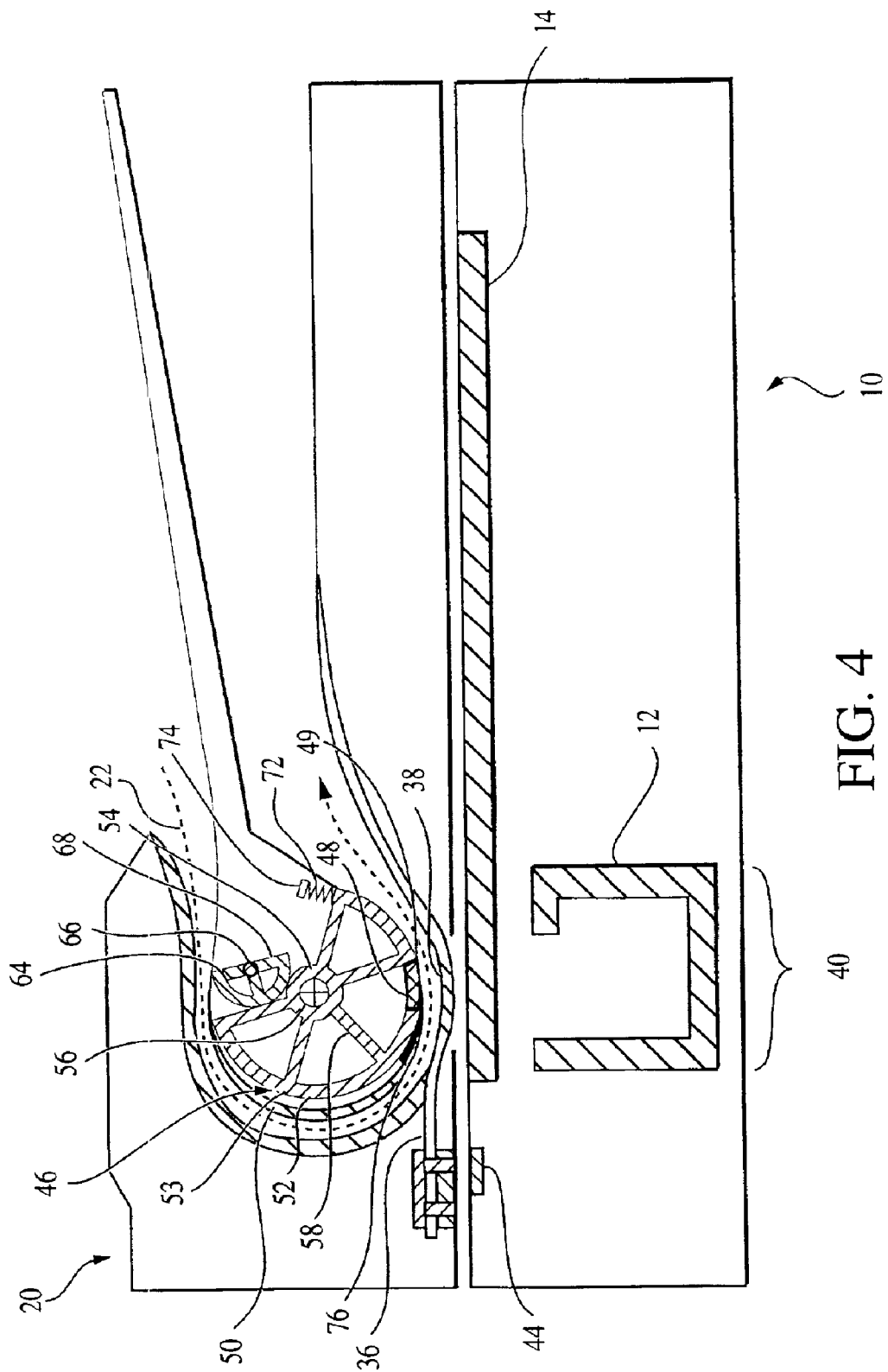
FIG. 4 is a simplified side illustration, partially in cross-section, of a scanner combined with a document feeder fitted with one embodiment of the calibration apparatus of the present invention, with the head assembly in a scan position, and the wheel assembly rotated so that the calibration strip is in the optical path of the head assembly.
Figure 5:
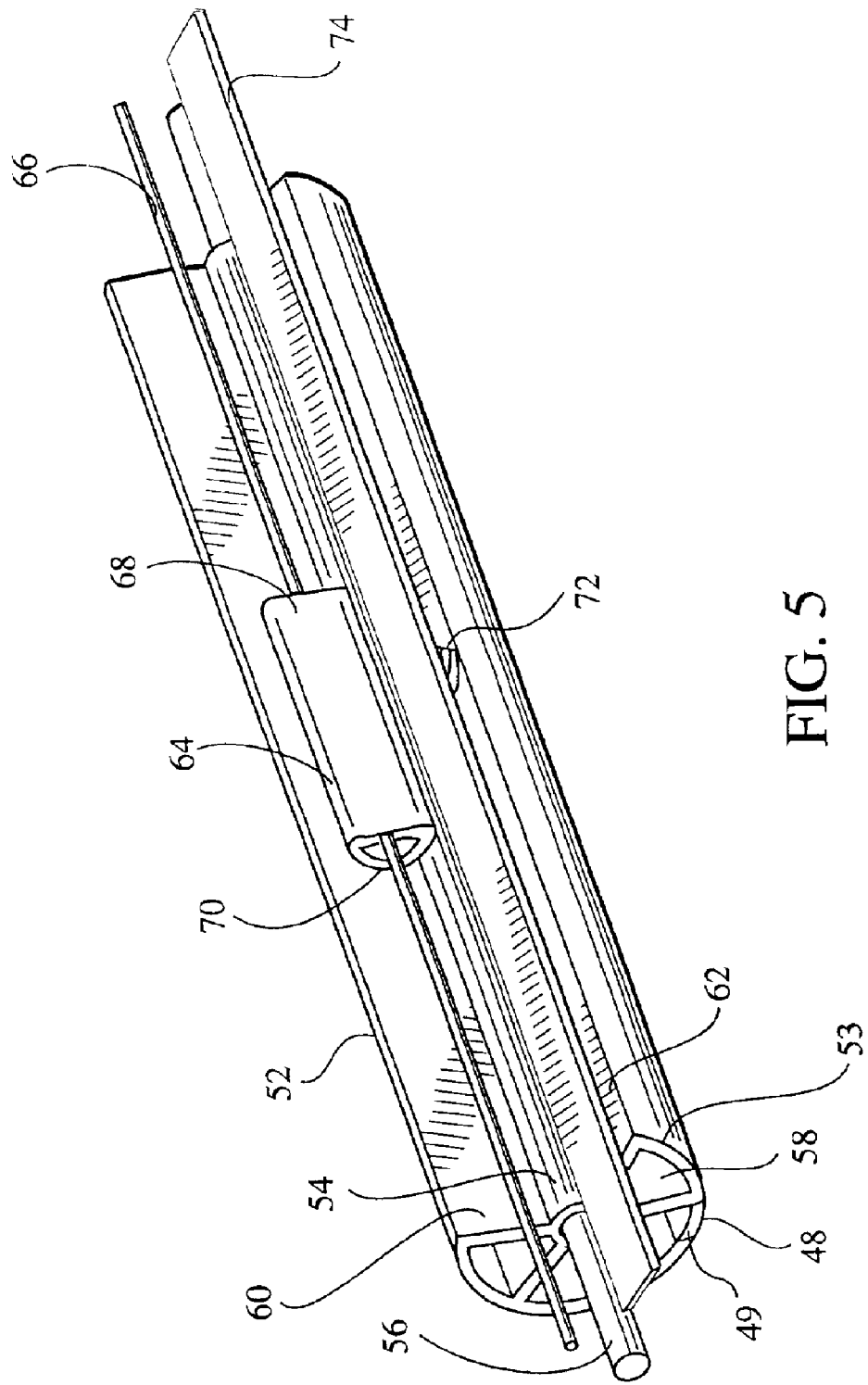
FIG. 5 is a perspective view of a wheel assembly used in one embodiment of the calibration apparatus and method of the present invention; and, FIG. 6 is a side illustration of the scanner and document feeder of FIG. 4, with the head assembly in a scan position, with the wheel assembly rotated so that the calibration strip is retracted out of the optical path of the head assembly.
Figure 6:
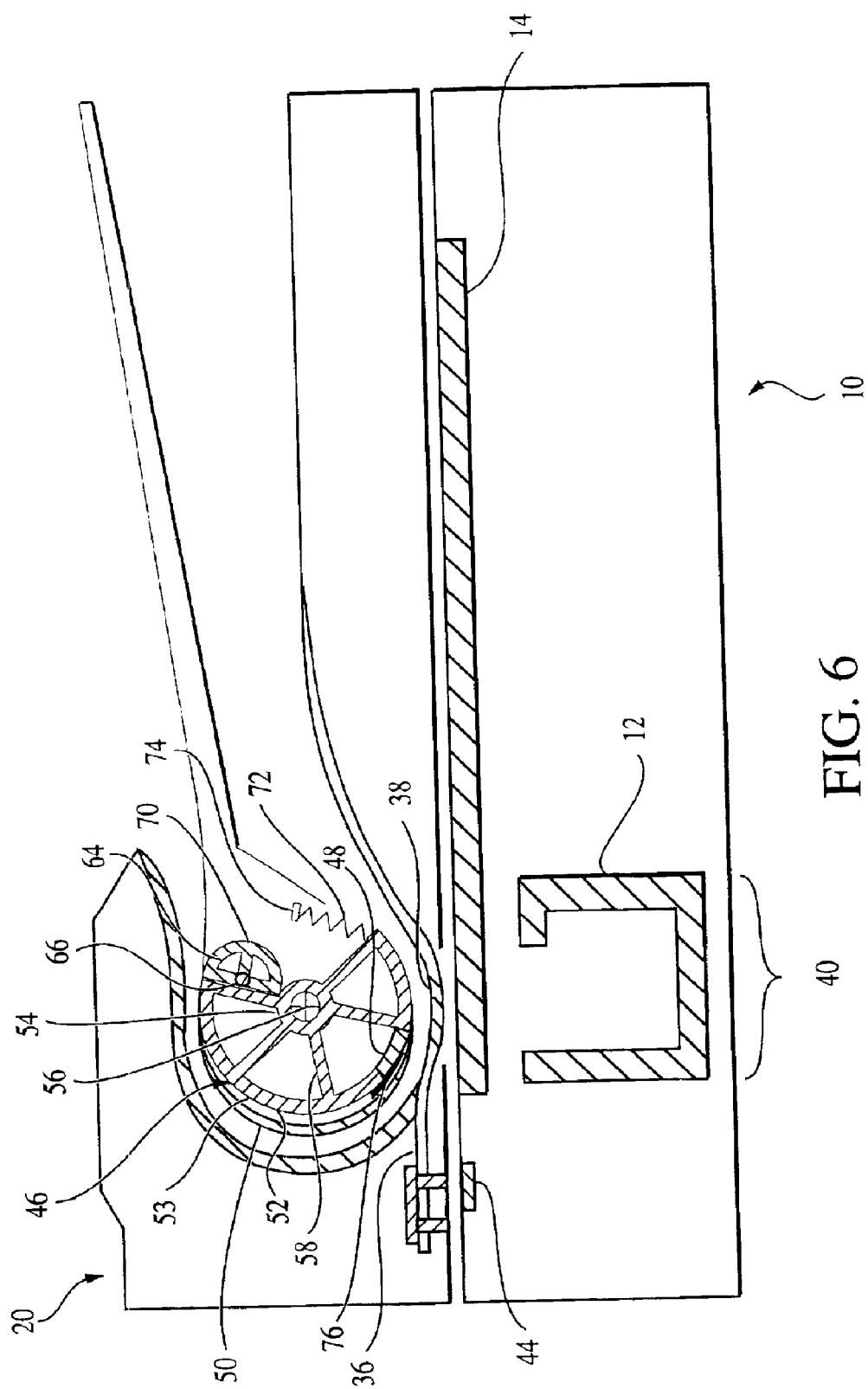

Turning now to FIGS. 4–6, a calibration apparatus 46 having a wheel assembly 52 is shown contained within the cylindrical guide 50. A calibration strip 48 is attached to a lower portion of an outer circumference 53 of the wheel assembly 52, and runs along the length of the wheel assembly, parallel to the length of the head assembly 12. The wheel assembly 52, preferably made of lightweight material such as plastic, contains an inner cylindrical portion 54, which rotates about an axle 56. The outer circumference 53 of the wheel assembly 52 is concentric with the inner cylindrical portion 54, extending approximately 240° around the cylindrical guide 50, as shown in section in FIGS. 4 and 6. Preferably, the wheel assembly 52 contains a series of structural members 58 extending around the wheel assembly, located at approximately 60° intervals. First and second exposed flat surfaces 60, 62 are thus formed, which extend longitudinally along the wheel assembly 52, as shown in FIG. 5.

The calibration strip 48 is preferably made of lightweight material such as MYLAR, and may be attached to the wheel assembly 52 via adhesive, although other methods of attachment are possible. A space or recess 49 in the outer circumference 53 of the wheel assembly may be provided for accommodating the calibration strip 48. The calibration strip 48 is typically a white strip employed for photo response non-uniformity (PRNU) calibration. The calibration strip 48 preferably has a length sufficient to be viewed by all of the pixel devices in the head assembly 12 while the head assembly is in its scan position 40.

A cam 64 is disposed within the cylindrical guide 50, abutting the first flat surface 60 of the wheel assembly 52. Substantially semicircular in section, the cam 64 extends along a longitudinal portion of the wheel assembly 52, as shown in FIG. 5. The cam 64 is stationed on a pivot 66, which is coupled to a pick-up mechanism (not shown) for the document feeder 20, or other such mechanism for actuating rotation of the pivot. The cam 64 abuttingly contacts the first flat surface 60 of the wheel assembly either with a flat surface 68 of the cam or (tangentially) with its curved surface 70. When the cam 64 rotates so that its point of contact with the wheel assembly 52 is changed from the cam's flat surface 68 to its curved surface 70, the cam rotationally urges the wheel assembly in the counterclockwise direction, to the position shown in FIG. 4. The wheel assembly 52 thus positions the calibration strip 48 in the optical path of the head assembly 12, over the portion 38 of the guide strip 36. Thus, while the head assembly 12 is ready to scan in position 40, it can also scan the calibration strip 48 to calibrate the scanner 10.

A biasing member 72, such as a spring, is connected at one end to the second flat surface 62 of the wheel assembly 52 and at its other end to a fixed stop 74 within the document feeder 20. The fixed stop 74 runs parallel to the axle 56 of the wheel assembly 52. The biasing member 72 constantly exerts a compressive, clockwise biasing force on the wheel assembly 52, rotationally urging the wheel assembly toward the cam 64. Therefore, when the cam pivot 66 rotates so that the flat surface 68 of the cam 64 contacts the wheel assembly 52, the wheel assembly rotates clockwise against the cam. The wheel assembly 52 is rotated to the position shown in FIG. 6, and thus retracts the calibration strip 48 out of the optical path of the head assembly 12. The wheel assembly 52 is constantly subjected to opposing rotational forces from the cam 64 and the biasing member 72. The balance of these forces holds the wheel assembly 52 in the positions shown in FIGS. 4 and 6, respectively.

When the calibration strip 48 is exposed to the optical path of the head assembly 12, it is simultaneously exposed to paper dust. To help prevent dust from the paper from contaminating the calibration strip 48, a preferably stationary cleaning blade 76 is provided. The cleaning blade 76 is situated within and runs along the length of the cylindrical guide 50, parallel to the length of the calibration strip 48. The cleaning blade 76 is preferably manufactured of rubber and attached to the inner surface of the cylindrical guide 50 by known means. When the wheel assembly 52 rotates clockwise, and the calibration strip 48 is thus moved away from the optical path of the head assembly 12, the cleaning blade 76 wipes the calibration strip 48, cleaning the calibration strip.

With regard to the scanner calibration operation, at the beginning of a scan job, or as an individual page is scanned, the cam pivot 66 is configured to rotate. This in turn rotates the cam 64 so that its curved surface 70 tangentially contacts the first flat surface 60 of the wheel assembly 52. The wheel assembly rotates counterclockwise so that the calibration strip 48 is exposed to the optical path of the head assembly 12 of the scanner 10. The biasing member 72 biases the wheel assembly 52 clockwise against the cam 64 to hold the wheel assembly in this position. The head assembly 12 then scans the calibration strip 48 to calibrate the scanner 10.

After the scanner 10 has been calibrated, the cam pivot 66 again rotates, rotating the cam 64 until the flat surface 68 of the cam contacts the flat surface 60 of the wheel assembly 52. The biasing member 72 rotates the wheel assembly 52 clockwise, moving the calibration strip 48 out of the optical path of the head assembly 12, and against the cleaning blade 76 so that the calibration strip 48 is wiped clean for the next calibration.

This calibration operation, or a similar one, can be configured to occur at the beginning of an ADF-fed scan job, or before individual pages are fed by the ADF. Such configuration will be apparent to those skilled in the art.

By employing a lightweight, low inertial calibration strip on the document feeder, additional motion of the head assembly is eliminated for ADF-fed scan jobs. A minimum of additional parts is necessary because the cam can be configured to be coupled to the existing pickup mechanism. As an additional benefit, since the calibration strip is in the document feeder behind the MYLAR guide strip (as shown in FIG. 4), the calibration strip has an identical optical path as that of a portion of an image scanned by an ADF-fed scan. Thus, imperfections, scratches, and smears present in the transparent portion of the guide strip are calibrated out, which is not possible for conventional scanner head assembly movement calibration.

From the foregoing description, it should be understood that an improved apparatus and method for calibrating an image-capturing device with a document feeder has been shown and described, which has many desirable attributes and advantages. With this inventive calibration apparatus, approximately 80% of scan jobs do not require movement of the scanner head assembly. As a result, the acoustic level of the scanner is reduced, and the reliability of the scanner mechanism is improved. The scan quality is improved due to identical optical path calibration. Impairment of print quality due to vibration of the scanner is reduced, and cost savings are derived due to an increased life cycle of the scanner.

While various embodiments of the present invention have been shown and described, it should be understood that other modifications, substitutions and alternatives can be made without departing from the spirit and scope of the invention, which should be determined from the appended claims.

What is claimed is:

1. An apparatus for calibrating a scanner head assembly in an image-capturing device of a type which includes a scanner head assembly and a document feeder for scanning an image, the apparatus comprising:
    a calibration member disposed within the document feeder, the calibration member being movable between at least an exposed position and a non-exposed position, the exposed position being within an optical path of the scanner head assembly when the scanner head assembly is ready for scanning; and
    a cleaning member within the document feeder for cleaning the calibration member, the cleaning member being configured to clean the calibration member when the calibration member is moved to the non-exposed position.

2. The apparatus as defined in claim 1 further comprising:
    a rotatable wheel assembly for holding the calibration member and positioning the calibration member within the optical path, the wheel assembly being disposed within the document feeder.

3. The apparatus as defined in claim 2 wherein the calibration member comprises a calibration strip attached to an outer circumference of the wheel assembly.

4. The apparatus as defined in claim 2 wherein the wheel assembly rotates the calibration member to the non-exposed position when the scanner head assembly is capturing an image.

5. The apparatus as defined in claim 2 further comprising:
    a cam disposed within the document feeder and abutting the wheel assembly for rotating the wheel assembly into either the exposed or non-exposed position.

6. The apparatus as defined in claim 5 wherein the cam is configured to alternately shift the calibration member between the exposed and non-exposed positions.

7. The apparatus as defined in claim 5 wherein the cam is configured to rotate the wheel assembly in clockwise and counterclockwise directions, whereby the calibration member is alternately moved between the exposed and non-exposed positions.

8. The apparatus as defined in claim 6 further comprising:
    a biasing member connected to the wheel assembly, the biasing member being configured to urge the wheel assembly towards the cam so as to retain the calibration member in either the exposed or non-exposed position.

9. The apparatus as defined in claim 1 wherein the cleaning member comprises a stationary cleaning blade disposed within the document feeder so as to contact the calibration member during movement.

10. The apparatus as defined in claim 6 wherein the cam is coupled to a motor of the document feeder for rotating the cam.

11. The apparatus as defined in claim 3 wherein the calibration strip is disposed within a cylindrical guide of the document feeder.

12. An image-capturing device, the image-capturing device comprising:
    a feeding mechanism for moving a document through a document feeder;
    a guiding mechanism for guiding the document into an optical path of a scanner head assembly to capture an image on the document;
    a calibration member configured to be movably positioned in the optical path of the scanner head assembly when the scanner head assembly is in a scan position, so that the scanner can be calibrated without the scanner head assembly moving from the scan position; and
    a cleaning member for cleaning the calibration member, the cleaning member being configured to clean the calibration member when the calibration member is moved to the optical path.

13. The image-capturing device as defined in claim 12 further comprising:
    a wheel assembly holding the calibration member for positioning the calibration member between an exposed position and a non-exposed position, the exposed position being within the optical path of the scanner head assembly when the scanner head assembly is in the stationary scan position; and
    an inner surface formed within the wheel assembly for receiving a force that causes the wheel assembly to rotate.

14. The image-capturing device as defined in claim 13 further comprising:
    a cam coupled to the feeding mechanism and abutting the inner surface of the wheel assembly for rotating the wheel assembly in clockwise and counterclockwise directions, wherein the calibration member is alternately positioned between the exposed position and the non-exposed position.

15. Method of calibrating a scanner in an image-capturing device having a scanning head assembly and a connected document feeder, the method comprising the steps of:

moving the scanning head assembly to a scanning position;

shifting a calibration strip into an optical path of the scanning head assembly while the scanning head assembly is in the scanning position;

scanning the calibration strip; and cleaning the calibration strip.

16. Apparatus for calibrating an image-capturing device of the type which includes a document feeder having a pickup mechanism coupled to a motor for feeding paper in a designated paper path substantially surrounding a cylindrical guide, the feeder being connected to an image-capturing device having a head assembly which in a first designated location scans the paper as the paper travels in the paper path, the apparatus comprising:

a wheel assembly disposed within the cylindrical guide and rotatingly connected to a fixed central axis for reciprocating motion between first and second positions, the wheel having a curved outer surface being less than 360 degrees in circumference and forming an open portion;

a calibration strip attached to the outer surface of the wheel such that when the wheel is in the first position the calibration strip is in an optical path of the scanner head in the first designated location, the calibration strip being adapted to calibrate an image-capturing device when scanned by the device;

a cam in abutting engagement with the wheel for urging the wheel to rotate into the first or second position, the cam being positioned within the open portion of the wheel;

a cam pivot connected to the cam and rotatingly coupled to the motor for rotating the cam; and, a biasing member connected to the wheel assembly and to a fixed stop within the cylindrical guide, the biasing member being configured to urge the wheel to rotate into abutment with the cam so as to retain the wheel in either the first or second position.

* * * * *